US009253474B2

(12) United States Patent
Rui

(10) Patent No.: US 9,253,474 B2
(45) Date of Patent: Feb. 2, 2016

(54) DUAL-VIEW IMAGE DISPLAY DEVICE AND DUAL-VIEW IMAGE DISPLAY METHOD USED FOR THE SAME WITH NONLINEAR ENLARGEMENT FOR OBTAINING FULLSCREEN IMAGES

(71) Applicant: TPV Display Technology (Xiamen) Co., Ltd., Xiamen (CN)

(72) Inventor: Ming-Zhao Rui, Xiamen (CN)

(73) Assignee: TPV Display Technology (Xiamen) Co., Ltd., Xiamen (CN)

( * ) Notice: Subject to any disclaimer, the term of this patent is extended or adjusted under 35 U.S.C. 154(b) by 306 days.

(21) Appl. No.: 13/798,269

(22) Filed: Mar. 13, 2013

(65) Prior Publication Data

US 2014/0028808 A1      Jan. 30, 2014

(30) Foreign Application Priority Data

Jul. 24, 2012   (CN) .......................... 2012 1 0258167

(51) Int. Cl.
  H04N 13/04   (2006.01)
  H04N 13/00   (2006.01)
  H04N 5/445   (2011.01)

(52) U.S. Cl.
  CPC ....... *H04N 13/0402* (2013.01); *H04N 5/44591* (2013.01); *H04N 13/0029* (2013.01); *H04N 13/0048* (2013.01); *H04N 5/445* (2013.01)

(58) Field of Classification Search
  CPC .......... H04N 13/0438; H04N 13/0445; H04N 13/0447
  USPC .......................................................... 348/51
  See application file for complete search history.

(56) References Cited

U.S. PATENT DOCUMENTS

| | | | | |
|---|---|---|---|---|
| 6,055,012 A | * | 4/2000 | Haskell et al. | 348/48 |
| 7,352,910 B2 | * | 4/2008 | Kanamori et al. | 382/254 |
| 8,145,013 B1 | * | 3/2012 | Sahu et al. | 382/298 |
| 8,595,782 B2 | * | 11/2013 | Sie et al. | 348/445 |
| 8,917,329 B1 | * | 12/2014 | Woodman et al. | 348/222.1 |
| 2004/0212731 A1 | * | 10/2004 | Sie et al. | 348/445 |
| 2012/0026157 A1 | * | 2/2012 | Unkel et al. | 345/419 |
| 2012/0050507 A1 | * | 3/2012 | Keys | 348/56 |
| 2012/0062530 A1 | | 3/2012 | Xiao | |
| 2013/0021391 A1 | | 1/2013 | Rui | |
| 2013/0021666 A1 | | 1/2013 | Rui | |
| 2013/0106998 A1 | * | 5/2013 | Pahalawatta et al. | 348/43 |
| 2013/0113884 A1 | * | 5/2013 | Leontaris et al. | 348/43 |
| 2013/0114680 A1 | * | 5/2013 | Leontaris et al. | 375/240.02 |

FOREIGN PATENT DOCUMENTS

CN       102426829 A      4/2012

* cited by examiner

*Primary Examiner* — Jay Patel
*Assistant Examiner* — Francis G Geroleo
(74) *Attorney, Agent, or Firm* — Alan D. Kamrath; Kamrath IP Lawfirm, P.A.

(57) ABSTRACT

A dual-view image display device includes a signal input module, a video processing module, a dual-view processing module and a display module, and the video processing module includes a nonlinear processing module. A dual-view image display method includes: inputting a video signal having a frame image that is split into two first images, processing the video signal to obtain the two first images, horizontally or vertically splitting each of the two first images into areas, nonlinearly enlarging each of the areas, and interpolating pixels to each of the enlarged areas to obtain two fullscreen second images. The nonlinear enlargement is used to allow the enlarged images generated during the dual-view image display to be robust to distortion, resulting in better image quality.

4 Claims, 9 Drawing Sheets

DUAL-VIEW IMAGE DISPLAY DEVICE AND DUAL-VIEW IMAGE DISPLAY METHOD USED FOR THE SAME WITH NONLINEAR ENLARGEMENT FOR OBTAINING FULLSCREEN IMAGES

BACKGROUND OF THE INVENTION

1. Field of the Invention

The invention relates to a dual-view image display device and a dual-view image display method used for the same. More particularly, the invention relates to a dual-view image display device that displays two images in fullscreen on a single screen and a dual-view image display method used for the same.

2. Description of the Related Art

Nowadays, there is an image display device for providing a function of a dual-view image display by splitting a frame image that occupies a screen entirely (i.e. so-called fullscreen image) into two images and then displaying the two split images in fullscreen on the screen to offer two individuals to watch respective split images in fullscreen at the same time without interference with each other. For example, Chinese Patent Application No. 201010281122.4 entitled "Synchronous-display-based dual-view display method used for single screen," No. 201010281121.X entitled "Asynchronous-display-based dual-view display method used for single screen," No. 201110304235.6 entitled "Dual-view display device and implementing method thereof," No. 201110204383.0 entitled "2D and 3D compatible eyeglasses and receiving method of the same," and No. 201110200673.8 entitled "2D and 3D compatible receiving device and receiving method of the same" disclose respective techniques to realize to display two split images in fullscreen on a single screen for two individuals to watch respective split images in fullscreen at the same time without interference with each other.

The size of each of the two split images is half the size of the frame image (i.e. the fullscreen image) owing to the fact that the frame image is split into the two split images. It is usually the case that the frame image is horizontally split into the two split images, or is vertically split into the two split images. When it proceeds to display the two split images in fullscreen, it needs to enlarge the two split images and usually linearly enlarges them. However, when it proceeds to linearly enlarge the two split images, severe image distortion will occur due to the disproportion between the aspect ratio of the frame image and the aspect ratio of the enlarged split image, resulting in poor image quality.

SUMMARY OF THE INVENTION

Accordingly, an object of the invention is to provide a dual-view image display device and a dual-view image display method used for the same to allow the enlarged images generated during the dual-view image display to be robust to distortion, resulting in better image quality.

According to an aspect of the invention, there is provided a dual-view image display device including a signal input module, a video processing module, a dual-view processing module and a display module. The signal input module receives a video signal having a frame image that is split into two first images. The video processing module is electrically connected to the signal input module and includes a nonlinear processing module. The video processing module processes the video signal received from the signal input module to obtain the two first images and then uses the nonlinear processing module to horizontally or vertically split each of the two first images into areas, to nonlinearly enlarge each of the areas, and to interpolate pixels to each of the enlarged areas to obtain two fullscreen second images. The dual-view processing module is electrically connected to the video processing module. The dual-view processing module processes the two second images outputted from the video processing module. The display module is electrically connected to the dual-view processing module. The display module displays the two processed second images outputted from the dual-view processing module.

In an embodiment of the dual-view image display device, the dual-view image display device further includes an emitting module. The emitting module is electrically connected to the dual-view processing module. The emitting module transmits a control signal when the two second images are asynchronously displayed.

According to another aspect of the invention, there is provided a dual-view image display method including: inputting a video signal having a frame image that is split into two first images, processing the video signal to obtain the two first images, horizontally or vertically splitting each of the two first images into areas, nonlinearly enlarging each of the areas, and interpolating pixels to each of the enlarged areas to obtain two fullscreen second images, processing the two second images and displaying the two processed second images.

In an embodiment of the dual-view image display method, the number of the areas is the same as the number of the enlarged areas the number of the enlarged areas is a positive even number M, then the enlarged areas are arranged in sequence as below: $S_{M/2}, S_{M/2-1}, S_{M/2-2}, \ldots, S_2, S_1, S_1, S_2, \ldots, S_{M/2-2}, S_{M/2-1}, S_{M/2}$, and the order of sizes of the enlarged areas is $S_{M/2} \geq S_{M/2-1} \geq S_{M/2-2} \geq \ldots \geq S_2 \geq S_1$. If the number of the enlarged areas is a positive odd number N, then the enlarged areas are arranged in sequence as below: $S_{(N+1)/2}, S_{(N+1/2-1)}, S_{(N+1/2-2)}, \ldots, S_2, S_1, S_2, \ldots, S_{(N+1)/2-2}, S_{(N+1)/2-1}, S_{(N+1)/2}$, and the order of sizes of the enlarged areas is $S_{(N+1)/2} \geq S_{(N+1)/2-1} \geq S_{(N+1)/2-2} \geq \ldots \geq S_2 \geq S_1$.

In an embodiment of the dual-view image display method, the two processed second images are displayed in an active shutter or a polarization dual-view image display mode.

The invention uses the nonlinear processing module disposed in the video processing module to horizontally or vertically split each of the two first images into areas, to nonlinearly enlarge each of the areas, and to interpolate pixels to each of the enlarged areas to obtain two fullscreen second images. It allows the enlarged images (i.e. the second images, each of which consists of the enlarged areas corresponding to one of the first images) generated during the dual-view image display to be robust to distortion, resulting in better image quality. For instance, the enlarged areas corresponding to a first image are arranged in the horizontal or vertical direction as below: the enlarged area at the center has minimum size, the enlarged areas at two sides have maximum size, and the other enlarged areas from the center to each side have increasing size, so that the central part of the enlarged image (i.e. the second image which consists of the enlarged areas corresponding to the first image) may have reduced distortion or almost no distortion.

BRIEF DESCRIPTION OF THE DRAWINGS

The foregoing and other features of the disclosure will be apparent and easily understood from a further reading of the specification and claims and by reference to the accompanying drawings in which:

DESCRIPTION OF THE PREFERRED EMBODIMENTS

Figure 1:
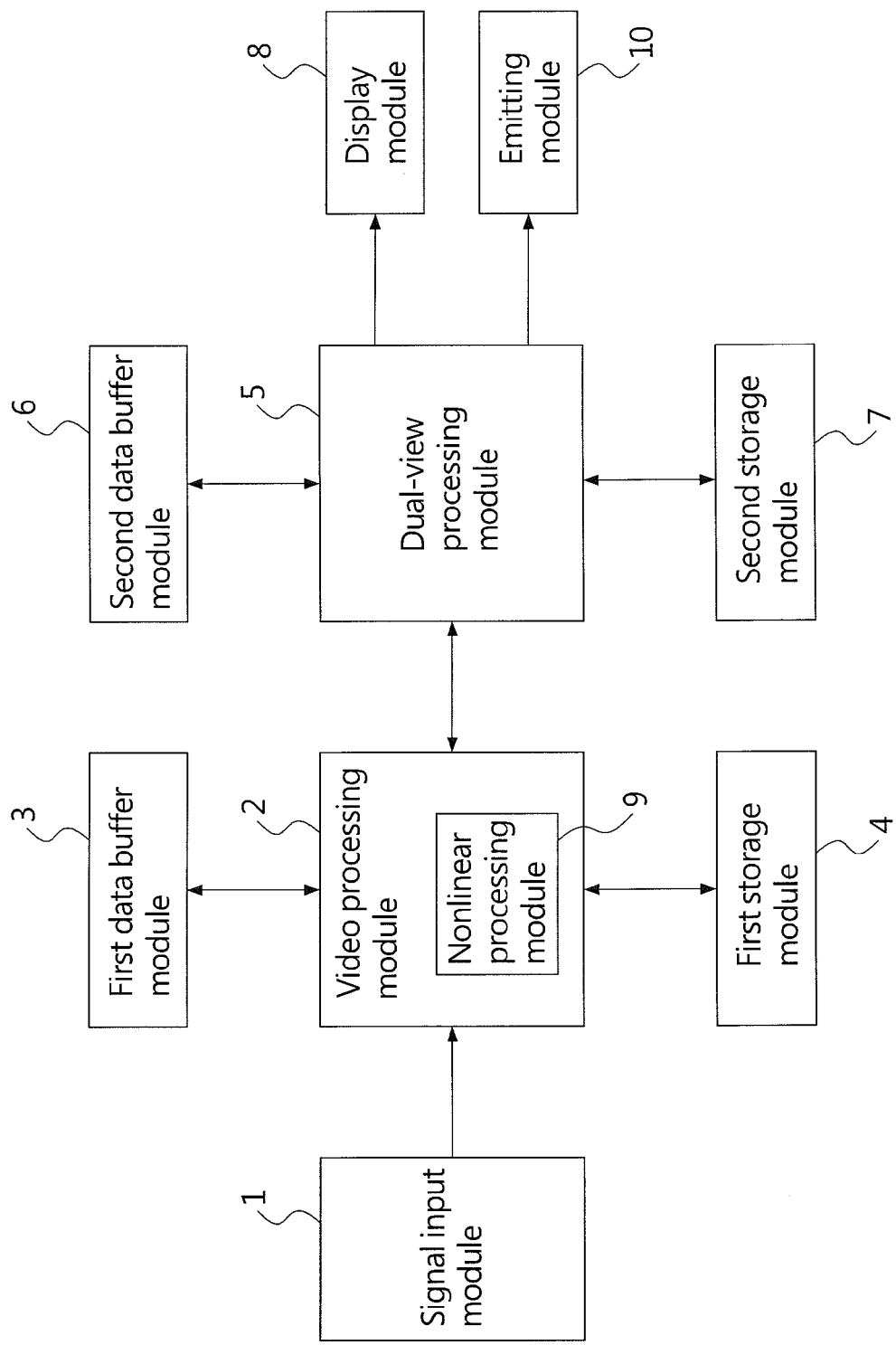
FIG. 1 is a schematic diagram illustrating a dual-view image display device according to an embodiment of the invention.

FIG. 1 is a schematic diagram illustrating a dual-view image display device according to an embodiment of the invention. Referring to FIG. 1, the dual-view image display device includes a signal input module 1, a video processing module 2, a first data buffer module 3, a first storage module 4, a dual-view processing module 5, a second data buffer module 6, a second storage module 7 and a display module 8. The video processing module 2 is electrically connected to the signal input module 1 and includes a nonlinear processing module 9. The dual-view processing module 5 is electrically connected to the video processing module 2. The display module 8 is electrically connected to the dual-view processing module 5. The video processing module 2 is further electrically connected to the first data buffer module 3 and the first storage module 4. The dual-view processing module 5 is further electrically connected to the second data buffer module 6 and the second storage module 7.

The signal input module 1 receives a video signal having a frame image that is split into two first images. In an embodiment, the video signal may consist of a single video signal input from a single video source, and the video signal has a frame image consisting of two first images. Therefore, the video signal may use a side-by-side half or a top-and-bottom half video format. In an alternative embodiment, the video signal may consist of two video signals input from two video sources. One video signal has a frame image consisting of a first image, and the other video signal has another frame image consisting of another first image. Therefore, the two video signals have two frame images having two first images. Moreover, the video signal may use a high-definition multimedia interface (HDMI), a component (YPbPr), a video graphics array (VGA), a composite or a radio frequency (RF) analog/digital audio/video interface.

The video processing module 2 performs a first-stage process for the video signal received from the signal input module 1. The first-stage process includes analog to digital converting, signal sampling, decoding, nonlinearly enlarging, low-voltage differential signaling (LVDS) encoding, and so on. The video processing module 2 performs the analog to digital converting, signal sampling, decoding and so on for the video signal to obtain the frame image of the video signal, and then determines the video format and the image structure of the video signal to split the frame image to obtain the two first images. Next, the video processing module 2 uses the nonlinear processing module 9 to horizontally or vertically split each of the two first images into areas, to nonlinearly enlarge each of the areas, and to interpolate pixels to each of the enlarged areas to obtain two fullscreen second images. Finally, the video processing module 2 encodes the two second images into an LVDS signal and then outputs the LVDS signal.

The first data buffer module 3 temporarily stores data generated during the first-stage process performed by the video processing module 2. The first storage module 4 stores the program code executed by the video processing module 2 and the information set by users.

The dual-view processing module 5 performs a second-stage process for the LVDS signal outputted from the video processing module 2. The second-stage process is a dual-view image display process including signal extracting, dual-view image analysis, encoding, and so on. The dual-view processing module 5 performs the signal extracting for the LVDS signal to obtain the two second images, and then performs the dual-view image analysis for the two second images to encode the two second images according to the dual-view image display mode performed by the display module 8. For example, under the polarization dual-view image display mode, the two second images are interlaced by a column to form a fullscreen image to display, and, therefore, the two second images are synchronously displayed. In a case, the two second images are interlaced by a column by using odd columns of pixels of the fullscreen image to display odd columns of pixels of one of the two second images, and using even columns of pixels of the fullscreen image to display even columns of pixels of the other of the two second images. Otherwise, under the active shutter dual-view image display mode, the two second images are alternatively displayed in full screen, and therefore, the two second images are asynchronously displayed.

The second data buffer module 6 temporarily stores data generated during the second-stage process performed by the dual-view processing module 5. The second storage module 7 stores the program code executed by the dual-view processing module 5 and the information set by users.

The display module 8 may be a liquid crystal display (LCD) monitor. The display module displays the two processed second images outputted from the dual-view processing module 5.

The dual-view image display device further includes an emitting module 10. The emitting module 10 is electrically connected to the dual-view processing module 5. The emitting module 10 is activated under the active shutter dual-view image display mode that alternatively displays the two second images in fullscreen (or asynchronously displays the two second images), to send a control signal to a receiver, such as an active shutter glasses Roll to control the switching of states of the receiver according to the two second images that are asynchronously displayed. The control signal may use an infrared (IR), a Bluetooth or a Wi-Fi interface.

Figure 2:
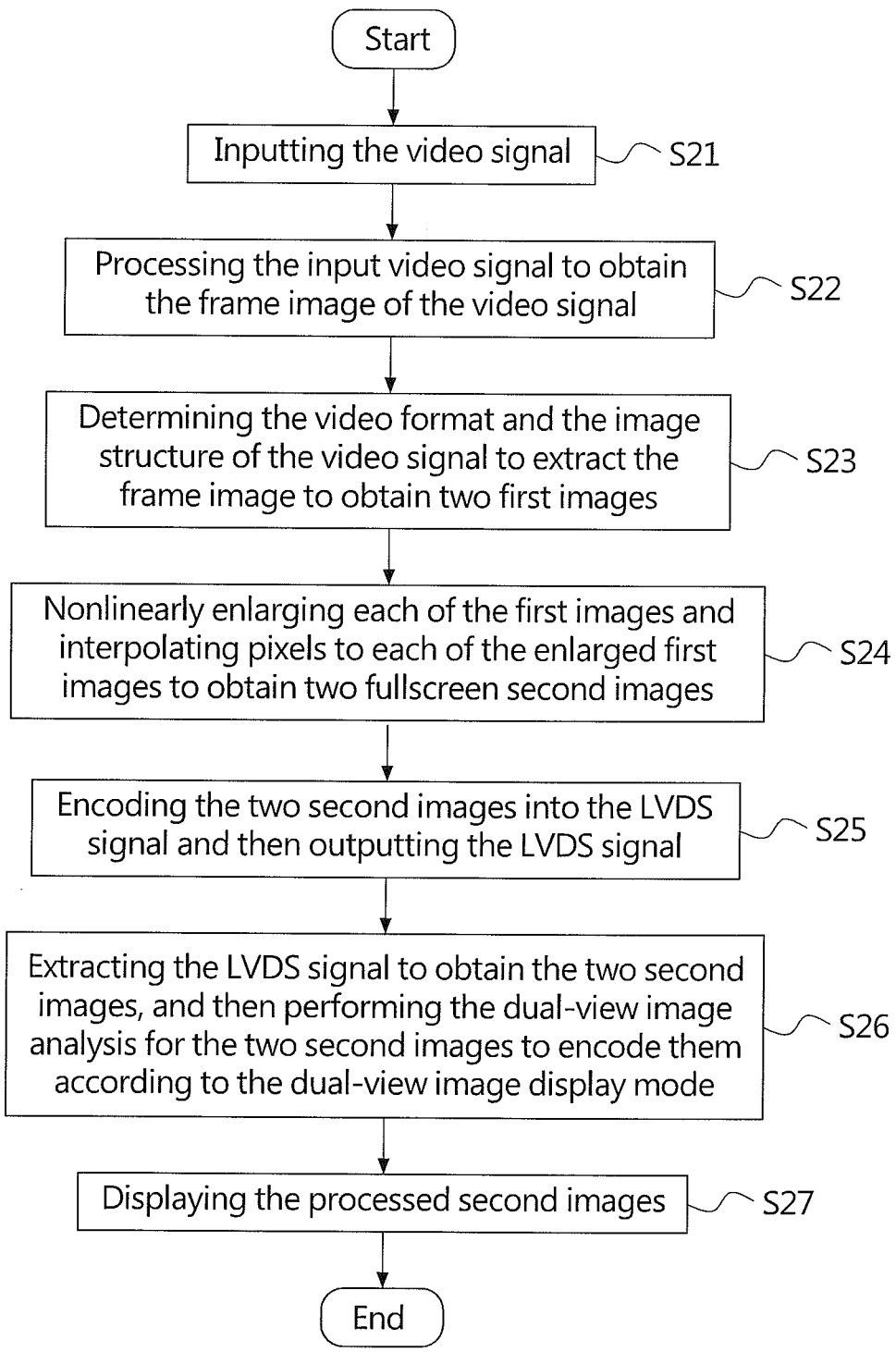
FIG. 2 is a flowchart illustrating a dual-view image display method according to an embodiment of the invention.

FIG. 2 is a flowchart illustrating a dual-view image display method according to an embodiment of the invention. Referring to FIG. 2, the dual-view image display method may be used for the dual-view image display device shown in FIG. 1. The dual-view image display method includes steps as below.

Step 1: The video signal is input to the signal input module 1 (S21).

Step 2:

(1) The video processing module 2 performs the analog to digital converting, signal sampling, decoding and so on for the video signal to obtain the frame image of the video signal (S22), and then determines the video format and the image structure of the video signal to extract the frame image to obtain the two first images (S23).

(2) The nonlinear processing module 9 of the video processing module 2 horizontally or vertically splits each of the two first images into areas, nonlinearly enlarges each of the areas, and interpolates pixels to each of the enlarged areas to obtain two fullscreen second images (S24), in which the number of interpolated pixels in one of the enlarged areas is proportional to the enlarged ratio of the one of the enlarged areas. That is, the nonlinear processing module 9 nonlinearly enlarges the two first images to obtain the two second images respectively. In an embodiment, the number of the areas is the same as the number of the enlarged areas. If the number of the enlarged areas is a positive even number M, then the enlarged areas are arranged in sequence as below: $S_{M/2}$, $S_{M/2-1}$, $S_{M/2-2}$, ..., $S_2$, $S_1$, $S_1$, $S_2$, ..., $S_{M/2-2}$, $S_{M/2-1}$, $S_{M/2}$, and the order of sizes of the enlarged areas is $S_{M/2} \geq S_{M/2-1} > S_{M/2-2} \geq ... \geq S_2 \geq S_1$. If the number of the enlarged areas is a positive odd number N, then the enlarged areas are arranged in sequence as below: $S_{(N+1)/2}$, $S_{(N+1)/2-1}$, $S_{(N+1)/2-2}$, ..., $S_2$, $S_1$, $S_2$, ..., $S_{(N+1)/2-2}$, $S_{(N+1)/2-1}$, $S_{(N+1)/2}$, and the order of sizes of the enlarged areas is $S_{(N+1)/2}$, $S_{(N+1)/2-1}$, $S_{(N+1)/2-2}$, ..., $S_2$, $S_1$. It is noted that M or N may be designed to be adjustable in real time if needed.

(3) The video processing module 2 encodes the two second images into the LVDS signal and then outputs the LVDS signal (S25).

Step 3: The dual-view processing module 5 receives the LVDS signal outputted from the video processing module 2 and performs the signal extracting for the LVDS signal to obtain the two second images. Next, the dual-view processing module 5 performs the dual-view image analysis for the two second images to encode the two second images according to the dual-view image display mode performed by the display module 8 (S26).

Step 4: The display module 8 displays the two processed second images outputted from the dual-view processing module 5 (S27). The display module 8 may use the polarization or active shutter dual-view image display mode to display the two processed second images.

Figure 3:
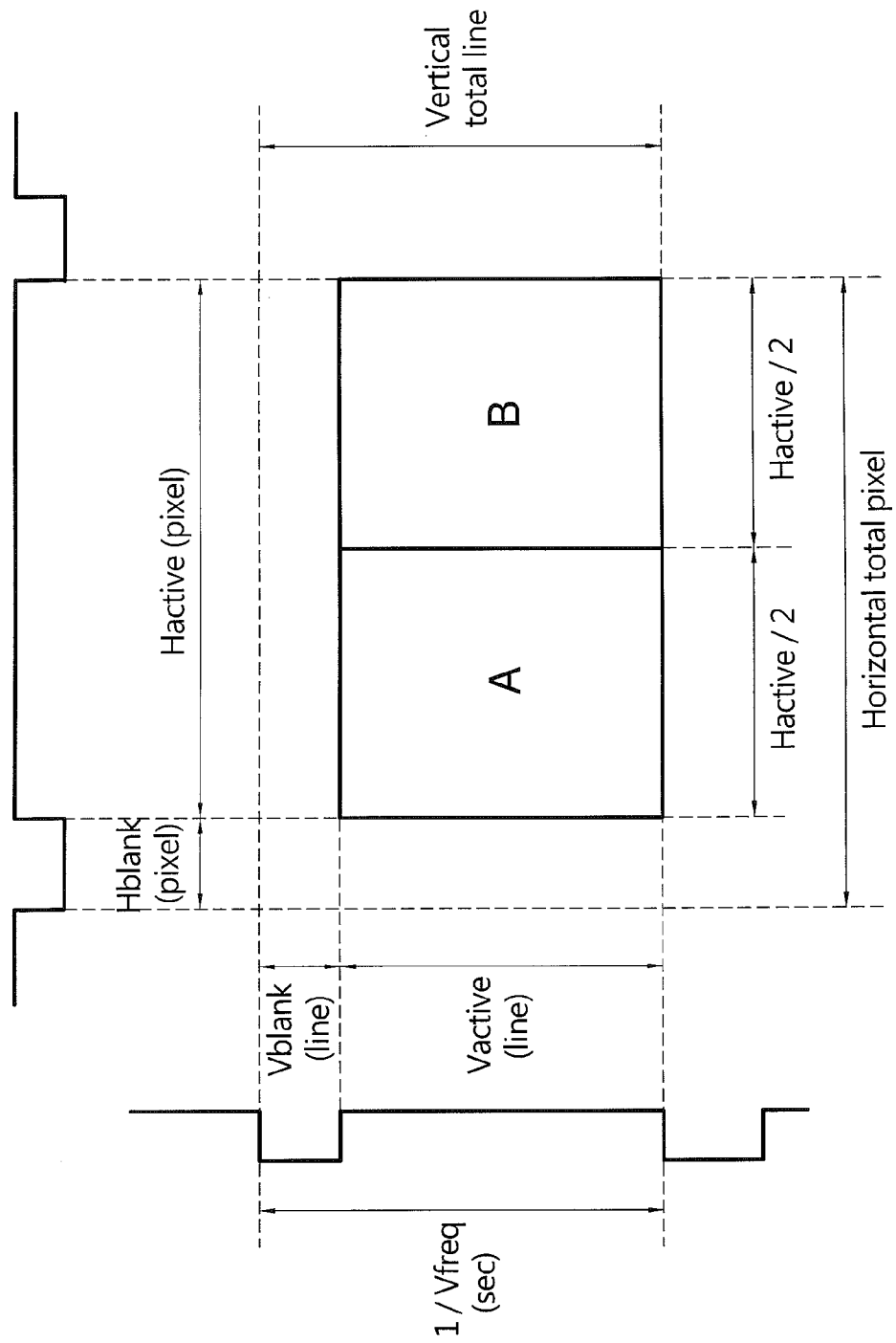
FIG. 3 is a schematic diagram illustrating a frame image having a frame format of side-by-side (half) according to an embodiment of the invention.

Taking a video signal shown in FIG. 3 as an example, the video signal uses a side-by-side half video format. That is to say, a frame image of the video signal is vertically split into two first images A and B, in which the first image A is on the left side of the frame image, and the first image B is on the right side of the frame image. It is assumed that the resolution of the frame image is 1920×1080 pixels, and therefor; the resolutions of the two first images A and B are both 960×1080 pixels. As a matter of convenient illustration, the frame image of the video signal shown in FIG. 3 is expressed by using grid lines together with circles shown in FIG. 4. The dual-view image display method includes steps as below.

Step 1: The video signal is input to the signal input module 1.

Figure 4:
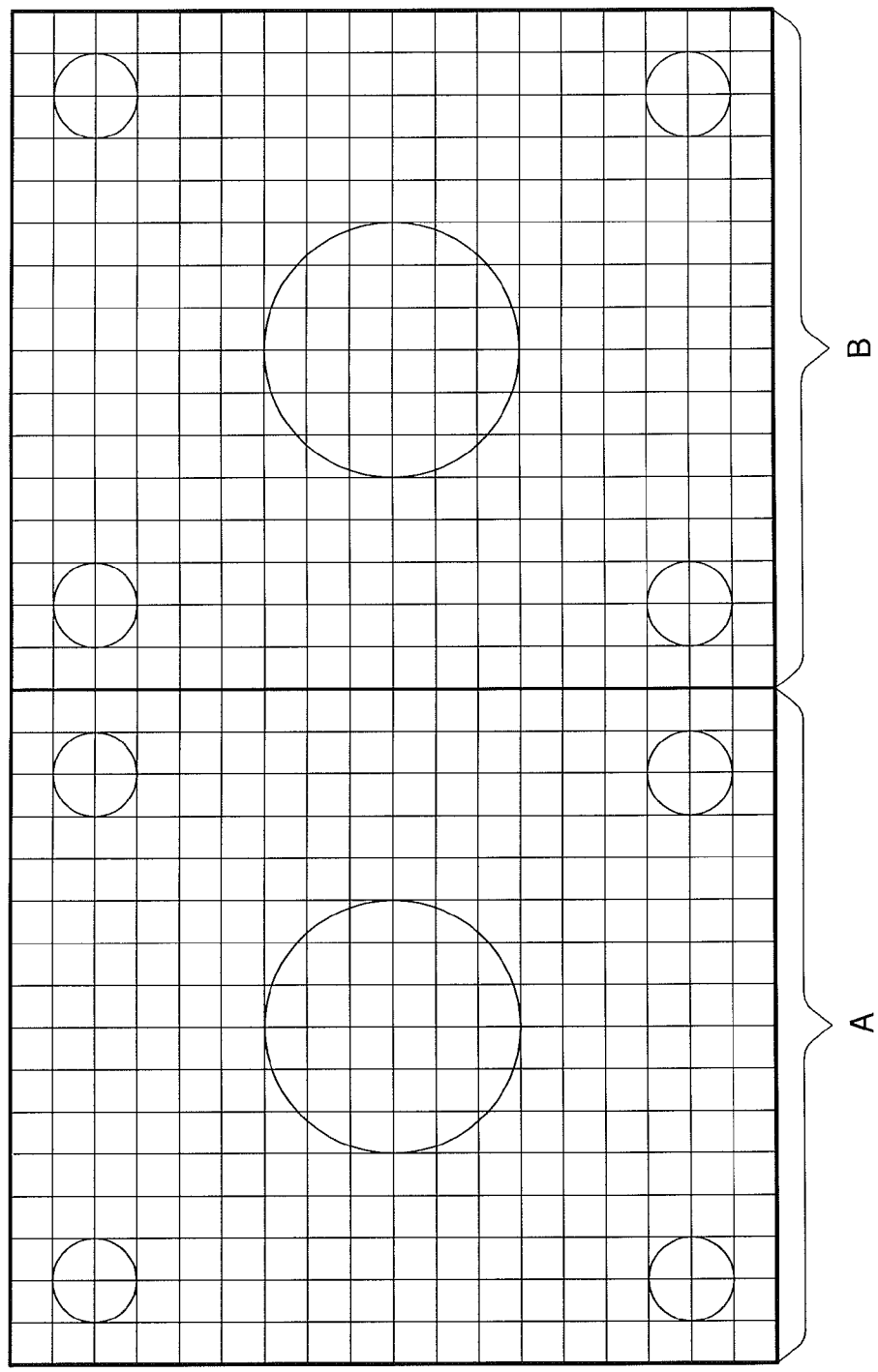
FIG. 4 is a schematic diagram illustrating the frame image shown in FIG. 3 by using grid lines together with circles.
Figure 5:
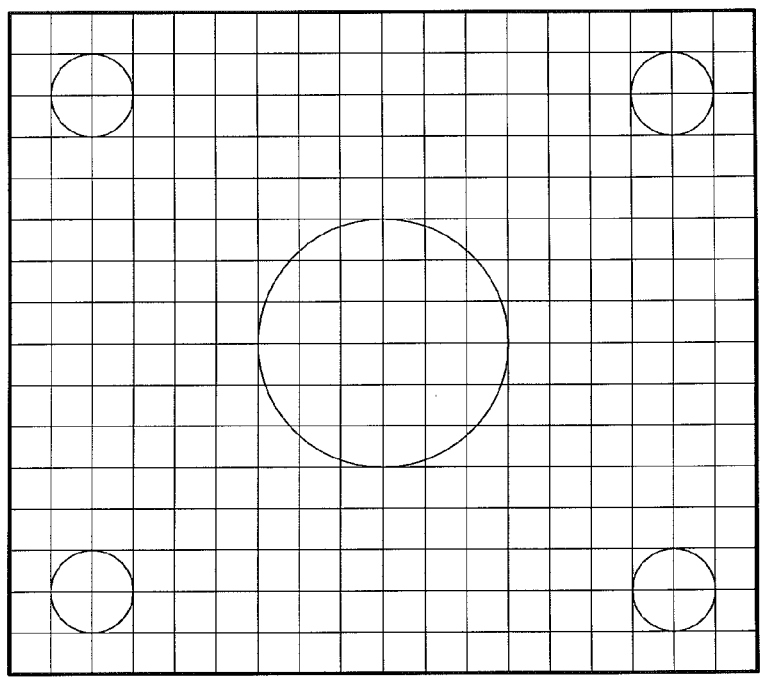
FIG. 5 is a schematic diagram illustrating a first image of the frame image shown in FIG. 4.
Figure 6:
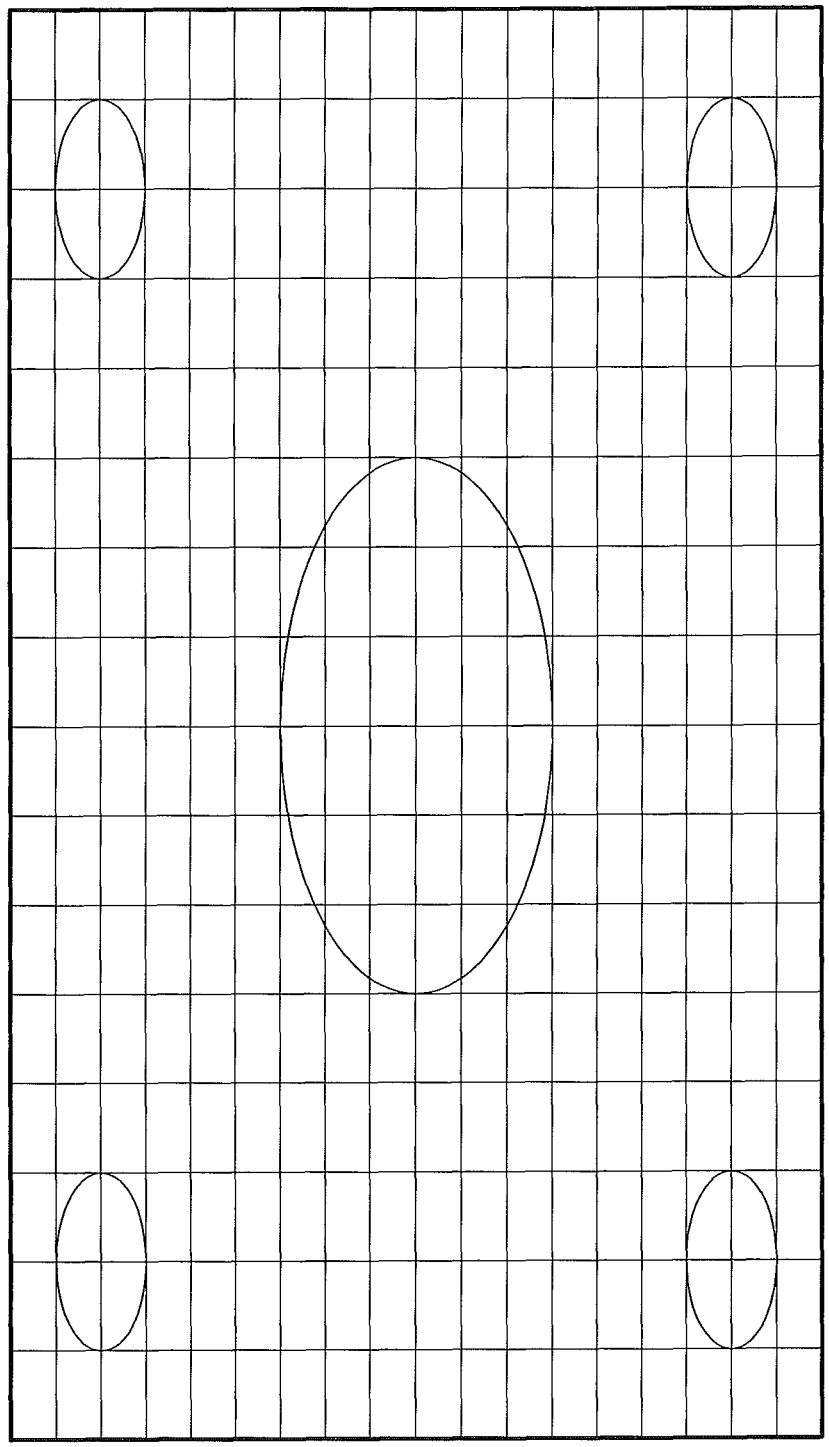
FIG. 6 is a schematic diagram illustrating a fullscreen image obtained by linearly enlarging the first image shown in FIG. 5 in a traditional way.

Step 2:

(1) The video processing module 2 performs the analog to digital converting, signal sampling, decoding and so on for the video signal to obtain the frame image of the video signal shown in FIG. 4, in which the frame image is vertically split into two first images A and B. Next, the video processing module 2 determines the video format and the image structure of the video signal to extract the frame image to obtain the two first images A and B, in which the first image A or B is shown in FIG. 5. If the first image A or B is linearly enlarged in the traditional way to a fullscreen image shown in FIG. 6, it shows severe distortion, resulting in poor image quality.

Figure 7:
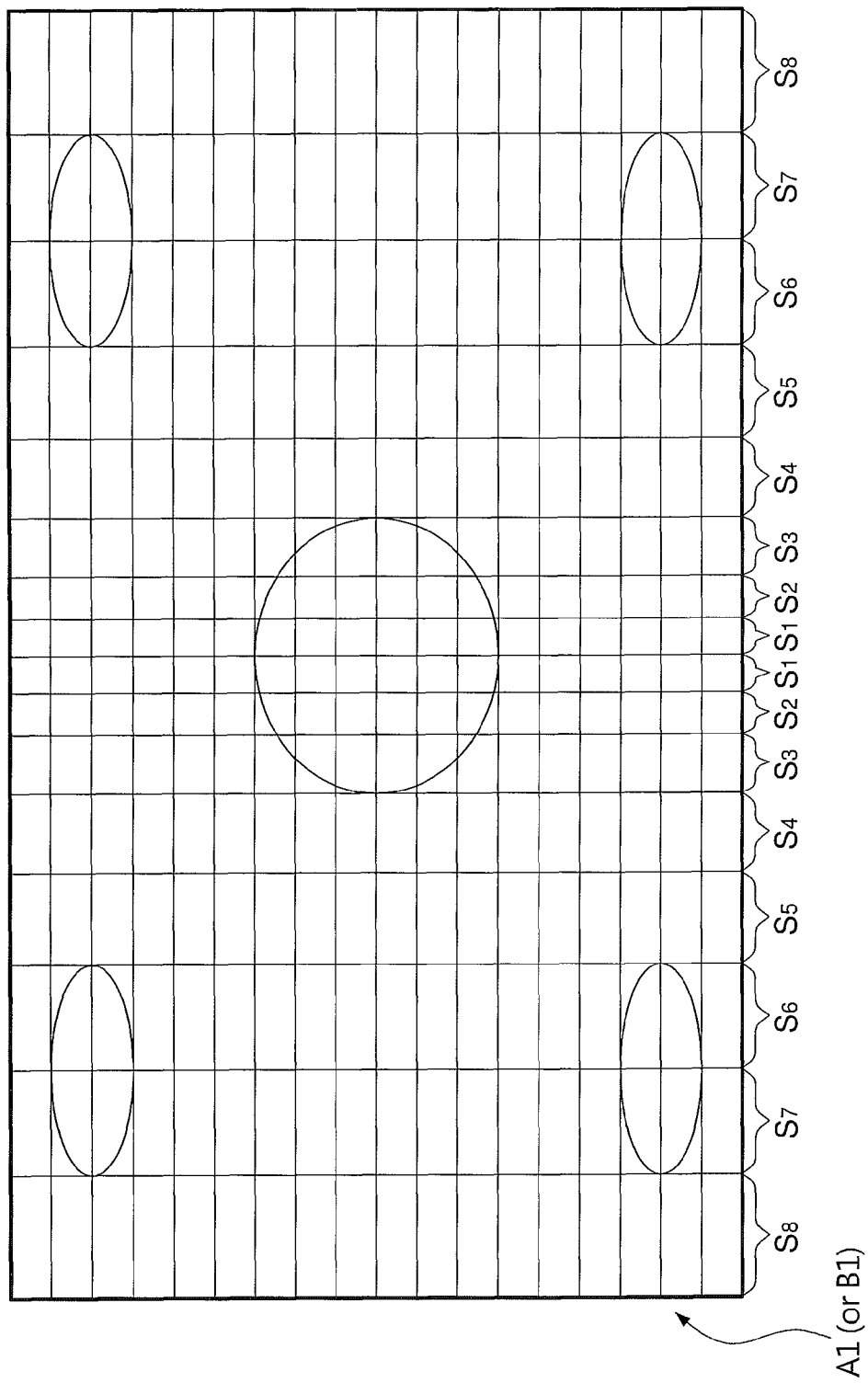
FIG. 7 is a schematic diagram illustrating a fullscreen (second) image obtained by nonlinearly enlarging the first image shown in FIG. 5 according to an embodiment of the invention.

(2) The nonlinear processing module 9 of the video processing module 2 vertically splits each of the two first images A and B into M areas, nonlinearly enlarges each of the M areas and interpolates pixels to each of the M enlarged areas according to the relationship between pixels of the first image and the relationship between the enlarged areas, to obtain two fullscreen second images A1 and B1, in which the resolutions of the two second images A1 and B1 are both 1920×1080 pixels. The number of interpolated pixels in one of the M enlarged areas is proportional to the enlarged ratio of the one of the M enlarged areas. That is to say, in one of the M enlarged areas, the higher the enlarged ratio is, the more interpolated pixels are needed. In the embodiment, M is 16. The second image A1 (or B1) is shown in FIG. 7. The 16 enlarged areas are arranged in the horizontal direction in sequence as below: $S_8$, $S_7$, $S_6$, ..., $S_2$, $S_1$, $S_1$, $S_2$, ..., $S_6$, $S_7$, $S_8$, and the order of sizes of the 16 enlarged areas is $S_8 \geq S_7 \geq S_6 \geq ... \geq S_2 \geq S_1$.

(3) The video processing module 2 encodes the two second images A1 and B1 into the LVDS signal and then outputs the LVDS signal.

Step 3: The dual-view processing module 5 receives the LVDS signal outputted from the video processing module 2 and performs the signal extracting for the LVDS signal to obtain the two second images A1 and B1. Next, the dual-view processing module 5 performs the dual-view image analysis for the two second images A1 and B1 to encode the two second images A1 and B1 according to the dual-view image display mode performed by the display module 8.

Step 4: The display module 8 displays the two processed second images A1 and B1 outputted from the dual-view processing module 5. The display module 8 may use the polarization or active shutter dual-view image display mode to display the two processed second images A1 and B1.

In another embodiment, the video signal uses a top-by-bottom half video format. That is to say, a frame image of the video signal is horizontally split into two first images, in which one of the first images is on the upper side of the frame image, and the other of the first images is on the lower side of the frame image. In that case, at Step 2 (2), the nonlinear processing module 9 of the video processing module 2 should horizontally split each of the two first images into M areas.

Figure 8:
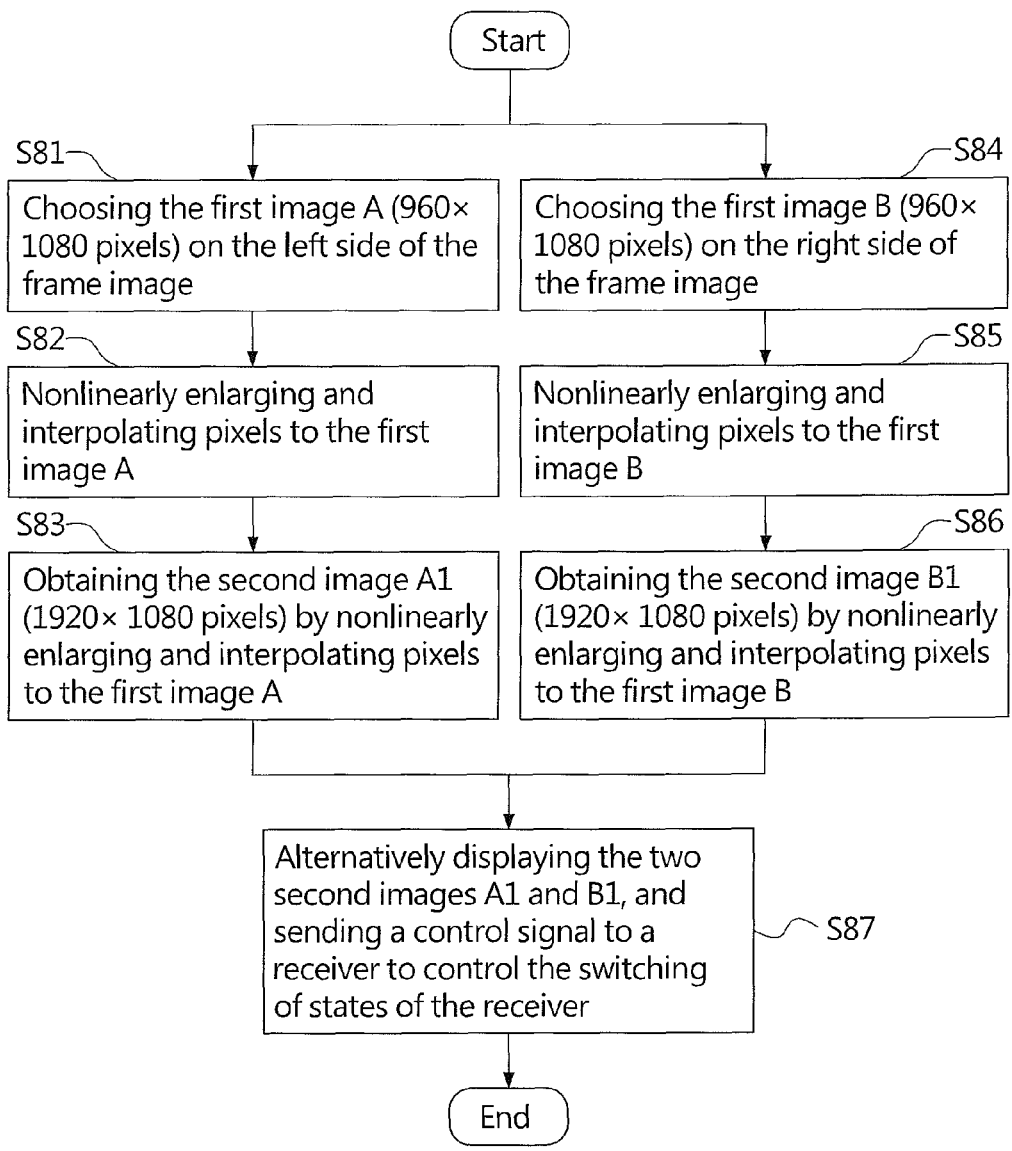
FIG. 8 is a flowchart illustrating Step 2 to Step 4 of the dual-view image display method using an active shutter dual-view image display mode according to an embodiment of the invention.

FIG. 8 is a flowchart illustrating Step 2 to Step 4 of the dual-view image display method using an active shutter dual-view image display mode according to an embodiment of the invention. Referring to FIG. 8, the video signal uses a side-by-side half video format. First, the first image A (its resolution is 960×1080 pixels) on the left side of the frame image of the video signal is chosen (S81). Next, by vertically splitting the first image A into 16 areas, nonlinearly enlarging each of the 16 areas, and interpolating pixels to each of the 16 enlarged areas (S82), the first image A is nonlinearly enlarged to obtain the second image A1 (its resolution is 1920×1080 pixels) (S83), in which the second image A1 consists of the 16 enlarged areas arranged in sequence as below: $S_8$, $S_7$, $S_6$, ..., $S_2$, $S_1$, $S_1$, $S_2$, ..., $S_6$, $S_7$, $S_8$, and the order of sizes of the 16 enlarged areas is $S_8 \geq S_7 \geq S_6 \geq ... \geq S_2 \geq S_1$. In addition, the first image B (its resolution is 960×1080 pixels) on the right side of the frame image of the video signal is chosen (S84) to process by the above-mentioned way (S85) to obtain the second image B1 (its resolution is 1920×1080 pixels) (S86). Finally, under the asynchronous active shutter dual-view image display mode, the two second images A1 and B1 are alternatively displayed, and a control signal is sent to a receiver to control the switching of states of the receiver according to the two second images A1 and B1 (S87).

Figure 9:
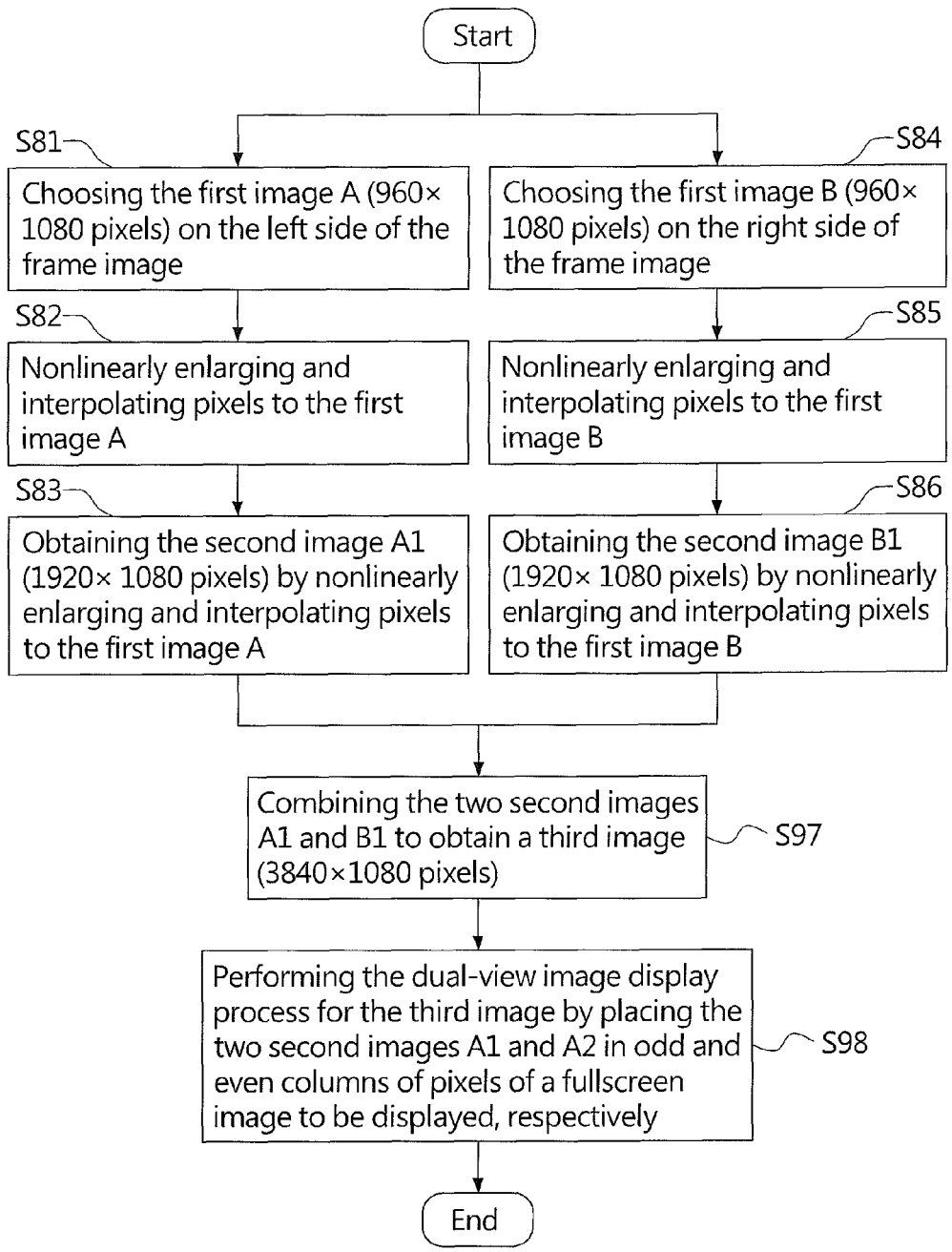
FIG. 9 is a flowchart illustrating Step 2 to Step 4 of the dual-view image display method using a polarization dual-view image display mode according to an embodiment of the invention.

FIG. 9 is a flowchart illustrating Step 2 to Step 4 of the dual-view image display method using a polarization dual-view image display mode according to an embodiment of the invention. Referring to FIG. 9, the video signal uses a side-by-side half video format. The dual-view image display methods shown in FIG. 8 and FIG. 9 have the same steps S81 through S86 of nonlinear enlargement and pixel interpolation. Under the synchronous polarization dual-view image display mode, first, the two second images A1 and B1 are combined to obtain a third image (its resolution is 3840×1080 pixels) (S97). After that, the third image is encoded into the LVDS signal to output to the dual-view processing module 5 to perform the dual-view image display process. In another embodiment, the two second images A1 and B1 may be alternatively outputted to the dual-view processing module 5, and the dual-view processing module 5 sends the received second image A1 to the second data buffer module 6 and then waits for the coming of the second image B1. After receiving the second image B1, the dual-view processing module 5 performs the dual-view image display process for the two second images A1 and B1 together. The dual-view processing module 5 performs the dual-view image display process for the third image by extracting the two second images A1 and B1 from the third image and then placing odd columns of pixels of the second image A1 in the odd columns of pixels of the fullscreen image to be displayed while placing even columns of pixels of the second image B1 in the even columns of pixels of the fullscreen image to be displayed (S98) to achieve the dual-view image display by displaying the two second images A1 and B1 in fullscreen at the same time.

It will be apparent to those skilled in the art that various modifications and variations can be made to the structure of the invention without departing from the scope or spirit of the invention. In view of the foregoing, it is intended that the invention cover modifications and variations of the invention provided they fall within the scope of the following claims and their equivalents.

I claim:

1. A dual-view image display device comprising:
a signal input module receiving a video signal having a frame image that is split into two first images;
a video processing module electrically connected to the signal input module, with the video processing module comprising a nonlinear processing module, with the video processing module processing the video signal received from the signal input module to obtain the two first images and then using the nonlinear processing module to horizontally or vertically split each of the two first images which are enlarged into a number of enlarged areas, wherein when the number of enlarged areas is a positive even number M, the number of enlarged areas is arranged in sequence as below: $S_{M/2}$ $S_{M/2-1}$ $S_{M/2-2}$, ..., $S_2$, $S_1$, $S_1$, $S_2$, ..., $S_{M/2-2}$ $S_{M/2-1}$ $S_{M/2}$ and when the number of enlarged areas is a positive odd number N, the number of enlarged areas is arranged in sequence as below: $S_{(N+1)/2}$, $S_{(N+1)/2-1}$, $S_{(N+1)/2-2}$, ..., $S_2$, $S_1$, $S_2$, ..., $S_{(N+1)/2-2}$, $S_{(N+1)/2-1}$, $S_{(N+1)/2}$, and to interpolate pixels to each enlarged area to obtain two fullscreen second images;
a dual-view processing module electrically connected to the video processing module, wherein when the number of enlarged areas is the positive even number M, then an order of sizes of the number of enlarged areas is $S_{M/2} > S_{M/2-1} > S_{M/2-2} > ... > S_2 > S_1$ and when the number of enlarged areas is the positive odd number N, then an order of sizes of the number of enlarged areas is $S_{(N+1)/2} > S_{(N+1)/2-1} > S_{(N+1)/2-2} > ... > S_2 > S_1$ with the dual-view processing module processing the two fullscreen second images outputted from the video processing module; and
a display module electrically connected to the dual-view processing module, with the display module displaying the two processed fullscreen second images outputted from the dual-view processing module.

2. The dual-view image display device according to claim 1, further comprising an emitting module, with the emitting module electrically connected to the dual-view processing module, with the emitting module transmitting a control signal when the two second images are asynchronously displayed.

3. The dual-view image display device according to claim 1, wherein the two processed second images are displayed in an active shutter or polarization dual-view image display mode.

4. A dual-view image display method according comprising:
inputting a video signal having a frame image;
nonlinearly processing the video signal to obtain two first images which are enlarged into a number of enlarged areas;
arranging the number of enlarged areas in the sequence below when the number of enlarged areas is a positive even number M: $S_{M/2}$, $S_{M/2-1}$, $S_{M/2-2}$, ..., $S_2$, $S_1$, $S_1$, $S_2$, ..., $S_{M/2-2}$, $S_{M/2-1}$, $S_{M/2}$;
arranging the number of enlarged areas in the sequence below when the number of enlarged areas is a positive odd number N: $S_{(N+1)/2}$, $S_{(N+1)/2-1}$, $S_{(N+1)/2-2}$, ..., $S_2$, $S_1$, $S_2$, ..., $S_{(N+1)/2-2}$, $S_{(N+1)/2-1}$, $S_{(N+1)/2}$;
interpolating pixels to each enlarged area to obtain two fullscreen second images;
ordering sizes of the number of enlarged areas when the number of enlarged areas is the positive even number M as $S_{M/2} > S_{M/2-1} > S_{M/2-2} > ... > S_2 > S_1$;
ordering sizes of the number of enlarged areas when the number of enlarged areas is the positive odd number N as $S_{(N+1)/2} > S_{(N+1)/2-1} > S_{(N+1)/2-2} > ... > S_2 > S_1$;
processing the two fullscreen second images; and
displaying the two processed fullscreen second images.

\* \* \* \* \*